United States Patent [19]

Berg et al.

[11] 3,829,846

[45] Aug. 13, 1974

[54] MULTI-FUNCTION LOGIC MODULE EMPLOYING READ-ONLY ASSOCIATIVE MEMORY ARRAYS

[75] Inventors: Robert Orval Berg; Kenneth James Thurber, both of St. Paul, Minn.

[73] Assignee: Honeywell Inc., Minneapolis, Minn.

[22] Filed: Nov. 15, 1972

[21] Appl. No.: 306,689

[52] U.S. Cl... 340/173 AM, 340/173 SP, 340/172.5
[51] Int. Cl. .......... G11c 15/00, G11c 17/00
[58] Field of Search..... 340/173 SP, 173 AM, 172.5

[56] References Cited

UNITED STATES PATENTS

| | | | |
|---|---|---|---|
| 2,872,664 | 2/1959 | Minot | 340/173 SP |
| 3,109,925 | 11/1963 | Wood | 340/173 SP |
| 3,245,051 | 4/1966 | Robb | 340/173 SP |
| 3,671,948 | 6/1972 | Cassen | 340/173 SP |

*Primary Examiner*—Terrell W. Fears
*Attorney, Agent, or Firm*—Molinare, Allegretti, Newitt & Witcoff

[57] ABSTRACT

A selectable-function, logic module, capable of being implemented on a single large-scale integrated (LSI) chip, in which all logical operations, including internal control functions, are performed by read-only associative memory (ROAM) arrays. Such modules, capable of both static combinational logic and sequential logic, may be employed as the basic building-blocks for large-scale processing systems or subsystems replacing the variety of discrete-function logic devices which would otherwise be employed.

3 Claims, 16 Drawing Figures

| FUNCTION NUMBER | FUNCTION | LOGIC REPRESENTATION |
|---|---|---|
| 0 | QUAD TWO–INPUT AND | 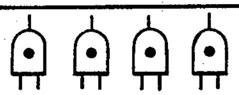 |
| 1 | DUAL FOUR–INPUT AND |  |
| 2 | EIGHT–INPUT AND |  |
| 3 | TWO DUAL TWO–INPUT AND, OR | 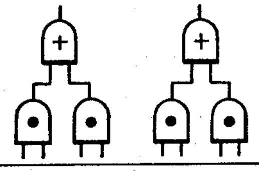 |
| 4 | DUAL FOUR–INPUT AND, OR | 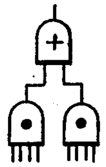 |
| 5 | AND, OR INPUT RS FLIP FLOP | 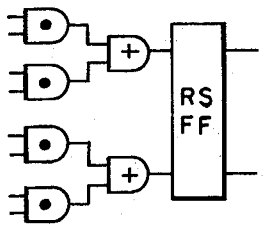  |
| 6 | TWO TWO–INPUT AND RS FLIP FLOP | 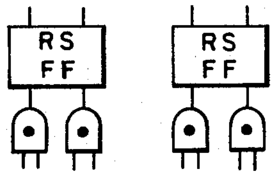  |
| 7 | TWO TWO–INPUT AND JK FLIP FLOP | 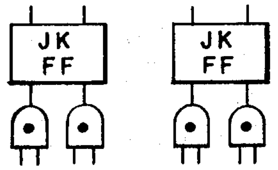  |
FIG. 7

| FUNCTION PERFORMED | $P_1P_2P_3$ | INPUTS | OUTPUT SELECTION | NUMBER |
|---|---|---|---|---|
| QUAD 2-INPUT AND | 000 | NORMAL | $O_2O_4O_6O_8$ | 1 |
| QUAD 2-INPUT NAND | 000 | NORMAL | $O_1O_3O_5O_7$ | 2 |
| QUAD 2-INPUT OR | 000 | COMPLEMENTED | $O_1O_3O_5O_7$ | 3 |
| QUAD 2-INPUT NOR | 000 | COMPLEMENTED | $O_2O_4O_6O_8$ | 4 |
| QUAD INVERTERS | 000 | $I_1=I_3=I_5=I_7=1$ REST NORMAL | $O_1O_3O_5O_7$ | 5 |
| DUAL 4-INPUT AND | 001 | NORMAL | $O_2O_4$ | 6 |
| DUAL 4-INPUT NAND | 001 | NORMAL | $O_1O_3$ | 7 |
| DUAL 4-INPUT OR | 001 | COMPLEMENTED | $O_1O_3$ | 8 |
| DUAL 4-INPUT NOR | 001 | COMPLEMENTED | $O_2O_4$ | 9 |
| 8 INPUT NAND | 010 | NORMAL | $O_1$ | 10 |
| 8 INPUT AND | 010 | NORMAL | $O_2$ | 11 |
| 8 INPUT OR | 010 | COMPLEMENTED | $O_1$ | 12 |
| 8 INPUT NOR | 010 | COMPLEMENTED | $O_2$ | 13 |
| TWO DUAL TWO INPUT AND OR | 011 | NORMAL | $O_2O_4$ | 14 |
| TWO DUAL TWO INPUT AND OR INVERT | 011 | NORMAL | $O_1O_3$ | 15 |
| TWO DUAL TWO INPUT NOR OR | 011 | COMPLEMENTED | $O_2O_4$ | 16 |
| TWO DUAL TWO INPUT OR AND | 011 | COMPLEMENTED | $O_1O_3$ | 17 |
| DUAL 4 INPUT AND OR | 100 | NORMAL | $O_2$ | 18 |
| DUAL 4 INPUT AND OR INVERT | 100 | NORMAL | $O_1$ | 19 |
| DUAL 4 INPUT NOR OR | 100 | COMPLEMENTED | $O_2$ | 20 |
| DUAL 4 INPUT OR AND | 100 | COMPLEMENTED | $O_1$ | 21 |
| AND OR INPUT RS FLIP-FLOP COMPLEMENTARY OUTPUTS | 101 | NORMAL | $O_1O_3(O_2O_4)$ | 22 |
| TWO INPUT AND RS FLIP-FLOP COMPLEMENTARY OUTPUTS | 110 | NORMAL | $O_1O_3O_5O_7(O_2O_4O_6O_8)$ | 23 |
| TWO INPUT AND JK FLIP-FLOP COMPLEMENTARY OUTPUTS | 111 | NORMAL | $O_1O_3O_5O_7(O_2O_4O_6O_8)$ | 24 |
| TWO TRIGGER FLIP-FLOPS COMPLEMENTARY OUTPUTS | 111 | $I_1=I_2=I_3=I_4=I_5=I_6=I_7=I_8$ | $O_1O_5(O_2O_6)$ | 25 |

FIG.9

| $I_0I_1I_2I_3$ \ DC | 0 0 | 0 1 | 1 0 | 1 1 |
|---|---|---|---|---|
| 0 0 0 0 | 0 0 0 0 | 0 0 0 0 | 0 0 0 1 | 1 1 1 1 |
| 0 0 0 1 | 0 0 0 1 | 0 0 0 0 | 0 0 1 0 | 0 0 0 0 |
| 0 0 1 0 | 0 0 1 0 | 0 0 0 0 | 0 0 1 1 | 0 0 0 1 |
| 0 0 1 1 | 0 0 1 1 | 0 0 0 0 | 0 1 0 0 | 0 0 1 0 |
| 0 1 0 0 | 0 1 0 0 | 0 0 0 0 | 0 1 0 1 | 0 0 1 1 |
| 0 1 0 1 | 0 1 0 1 | 0 0 0 0 | 0 1 1 0 | 0 1 0 0 |
| 0 1 1 0 | 0 1 1 0 | 0 0 0 0 | 0 1 1 1 | 0 1 0 1 |
| 0 1 1 1 | 0 1 1 1 | 0 0 0 0 | 1 0 0 0 | 0 1 1 0 |
| 1 0 0 0 | 1 0 0 0 | 0 0 0 0 | 1 0 0 1 | 0 1 1 1 |
| 1 0 0 1 | 1 0 0 1 | 0 0 0 0 | 1 0 1 0 | 1 0 0 0 |
| 1 0 1 0 | 1 0 1 0 | 0 0 0 0 | 1 0 1 1 | 1 0 0 1 |
| 1 0 1 1 | 1 0 1 1 | 0 0 0 0 | 1 1 0 0 | 1 0 1 0 |
| 1 1 0 0 | 1 1 0 0 | 0 0 0 0 | 1 1 0 1 | 1 0 1 1 |
| 1 1 0 1 | 1 1 0 1 | 0 0 0 0 | 1 1 1 0 | 1 1 0 0 |
| 1 1 1 0 | 1 1 1 0 | 0 0 0 0 | 1 1 1 1 | 1 1 0 1 |
| 1 1 1 1 | 1 1 1 1 | 0 0 0 0 | 0 0 0 0 | 1 1 1 0 |

DC=00 STOP
DC=01 RESET
DC=10 COUNT UP
DC=11 COUNT DOWN

FIG. 13A

| $I_0I_1I_2I_3$ \ PDC | 1 X X | 0 0 X | 0 1 1 | 0 1 0 |
|---|---|---|---|---|
| 0 0 0 0 | 0 0 0 0 | 0 0 0 0 | 0 0 0 1 | 1 0 0 1(1) |
| 0 0 0 1 | 0 0 0 1 | 0 0 0 1 | 0 0 1 0 | 0 0 0 0 |
| 0 0 1 0 | 0 0 1 0 | 0 0 1 0 | 0 0 1 1 | 0 0 0 1 |
| 0 0 1 1 | 0 0 1 1 | 0 0 1 1 | 0 1 0 0 | 0 0 1 0 |
| 0 1 0 0 | 0 1 0 0 | 0 1 0 0 | 0 1 0 1 | 0 0 1 1 |
| 0 1 0 1 | 0 1 0 1 | 0 1 0 1 | 0 1 1 0 | 0 1 0 0 |
| 0 1 1 0 | 0 1 1 0 | 0 1 1 0 | 0 1 1 1 | 0 1 0 1 |
| 0 1 1 1 | 0 1 1 1 | 0 1 1 1 | 1 0 0 0 | 0 1 1 0 |
| 1 0 0 0 | 1 0 0 0 | 1 0 0 0 | 1 0 0 1 | 0 1 1 1 |
| 1 0 0 1 | 1 0 0 1 | 1 0 0 1 | 0 0 0 0(1) | 1 0 0 0 |
| 1 0 1 0 | 1 0 1 0 | 1 0 1 0 | 0 0 0 1 | 0 0 0 1 |
| 1 0 1 1 | 1 0 1 1 | 1 0 1 1 | 0 0 0 0 | 0 0 0 0 |
| 1 1 0 0 | 1 1 0 0 | 1 1 0 0 | 0 0 0 1 | 0 0 0 1 |
| 1 1 0 1 | 1 1 0 1 | 1 1 0 1 | 0 0 0 0 | 0 0 0 0 |
| 1 1 1 0 | 1 1 1 0 | 1 1 1 0 | 0 0 0 1 | 0 0 0 1 |
| 1 1 1 1 | 1 1 1 1 | 1 1 1 1 | 0 0 0 0 | 0 0 0 0 |

PDC = 1XX PRESET
PDC = 00X HOLD
PDC = 011 COUNT UP
PDC = 010 COUNT DOWN

FIG. 13B ( ) VALUE IN FIFTH COLUMN INDICATES THE OUTPUT VALUE WHEN IT BECOMES 1. THIS IS THE "CARRY OUT" $D_O$.

| $I_0I_1I_2I_3$ \ PDC | 1 X X | 0 0 X | 0 1 1 | 0 1 0 |
|---|---|---|---|---|
| 0 0 0 0 | 0 0 0 0 | 0 0 0 0 | 0 0 0 1 | 1 1 1 1(1) |
| 0 0 0 1 | 0 0 0 1 | 0 0 0 1 | 0 0 1 0 | 0 0 0 0 |
| 0 0 1 0 | 0 0 1 0 | 0 0 1 0 | 0 0 1 1 | 0 0 0 1 |
| 0 0 1 1 | 0 0 1 1 | 0 0 1 1 | 0 1 0 0 | 0 0 1 0 |
| 0 1 0 0 | 0 1 0 0 | 0 1 0 0 | 0 1 0 1 | 0 0 1 1 |
| 0 1 0 1 | 0 1 0 1 | 0 1 0 1 | 0 1 1 0 | 0 1 0 0 |
| 0 1 1 0 | 0 1 1 0 | 0 1 1 0 | 0 1 1 1 | 0 1 0 1 |
| 0 1 1 1 | 0 1 1 1 | 0 1 1 1 | 1 0 0 0 | 0 1 1 0 |
| 1 0 0 0 | 1 0 0 0 | 1 0 0 0 | 1 0 0 1 | 0 1 1 1 |
| 1 0 0 1 | 1 0 0 1 | 1 0 0 1 | 1 0 1 0 | 1 0 0 0 |
| 1 0 1 0 | 1 0 1 0 | 1 0 1 0 | 1 0 1 1 | 1 0 0 1 |
| 1 0 1 1 | 1 0 1 1 | 1 0 1 1 | 1 1 0 0 | 1 0 1 0 |
| 1 1 0 0 | 1 1 0 0 | 1 1 0 0 | 1 1 0 1 | 1 0 1 1 |
| 1 1 0 1 | 1 1 0 1 | 1 1 0 1 | 1 1 1 0 | 1 1 0 0 |
| 1 1 1 0 | 1 1 1 0 | 1 1 1 0 | 1 1 1 1 | 1 1 0 1 |
| 1 1 1 1 | 1 1 1 1 | 1 1 1 1 | 0 0 0 0(1) | 1 1 1 0 |

PDC = 1XX PRESET
PDC = 0XX HOLD
PDC = 011 COUNT UP
PDC = 010 COUNT DOWN

FIG. 13C ( ) VALUE IN FIFTH COLUMN INDICATES THE OUTPUT VALUE WHEN IT BECOMES 1. THIS IS THE "CARRY OUT" $D_O$.

MULTI-FUNCTION LOGIC MODULE EMPLOYING READ-ONLY ASSOCIATIVE MEMORY ARRAYS

BACKGROUND OF THE INVENTION

This invention relates to information processing systems and, more particularly, to circuits for performing logical operations upon data signals in such systems.

The design of a complex information processing system, such as a computer, often begins with the formulation of large numbers of albegraic statements, each describing a logical sub-function to be accomplished. The physical system is then realized by selecting, from an inventory of available devices, those capable of performing the various individual logical operations required by each algebraic statement.

From several standpoints, it is desireable to minimize the number of different types of devices used. Replacement and repair is simplified when the system is constructed from only a small number of different "building blocks". Reducing the number of different devices means that the selected devices are used more often, and this increased use lowers the unit cost of device development, manufacture and distribution.

It is accordingly a conventional practice, in the product design phase of a new information processing system, to specify a limited inventory of devices to be used. Where logic statements originally formulated call for functions unavailable from any device in the selected inventory, either a new statement is written which is compatible with the available devices, or a special purpose component is added to the inventory to accomplish the needed, but otherwise unavailable, function. In the main, however, it has been found that, with careful logic design, a relatively small number of different components can be employed to implement a major portion of the needed operations.

It is therefore a principal object of the present invention to provide a single, modular, multi-function component, capable of accomplishing the most widely-needed functions of a given processing system and, in this way, to lower the cost, and to simplify the maintenance, of such a system.

In a principle aspect, the present invention takes the form of a selectable-function, combinational logic module, capable of being implemented on a single large-scale integrated (LSI) chip, in which substantially all logical operations, including internal control functions, are performed by read-only associative memory (ROAM) arrays. The invention may be arranged to perform either sequential or static logic operations, and the two versions may be combined as building blocks to form a more generalized sequential processing system.

These and other objects, features and advantages of the present invention may be more clearly understood through a consideration of the following detailed description which is presented in connection with the attached drawings, in which:

BRIEF DESCRIPTION OF THE DRAWINGS

FIG. 7 is a table showing 8 commonly needed combinational logic functions which may be supplied by a single module constructed in accordance with the principles of the present invention.

FIG. 9 is a table showing that, by selection of appropriate outputs and the selective use of complementary inputs, 25 specific logic functions can be carried out by the module of FIG. 8.

FIGS. 13A, 13B, and 13C are flow tables which respectively define the characteristics of the resettable binary counter, the BCD decade counter, and the presettable binary counter ROAM 1 arrays used to implement the sequential logic module of FIG. 14.

DESCRIPTION OF READ-ONLY DEVICES AND THEIR USE AS LOGIC DEVICES

Before discussing the details of the multi-function logic module embodying the principles of the present invention, a brief review of the structure and operation of both the read-only memory (ROM) and two classes of read-only associative memory, (ROAM 1 and ROAM 2) is presented immediately below. Further information on such memory arrays and the background of the present invention may be found in applicants' paper entitled "Universal Logic Modules Implemented Using LSI Memory Techniques", pp. 177–194, AFIPS Conference Proceedings, Fall Joint Computer Conference (presented November 16, 1971).

Figures 1, 2, 3:
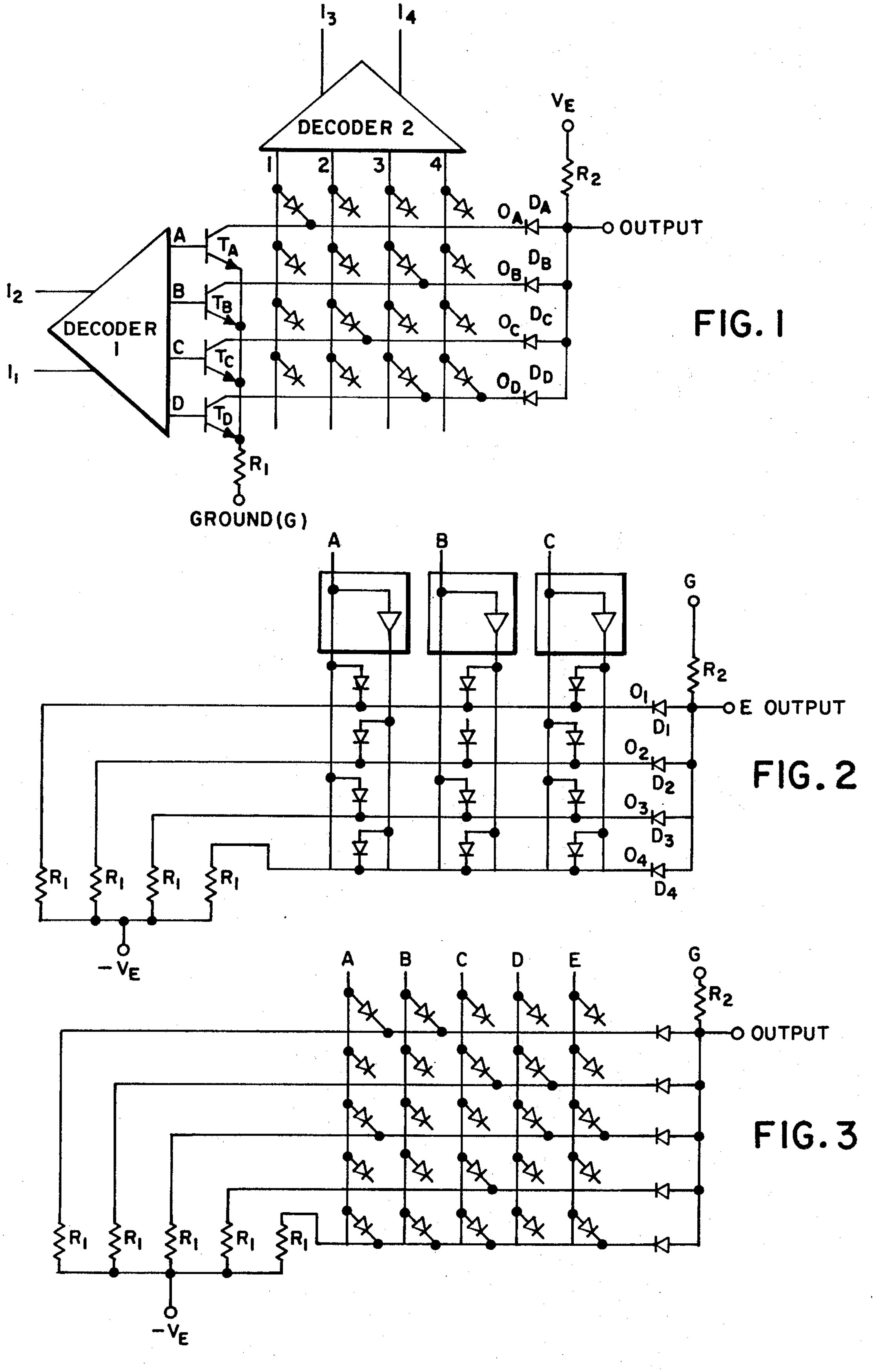
FIG. 1 is a schematic diagram of an illustrative 16 word by 1 bit read-only memory (ROM) of known design.
FIG. 2 is a schematic diagram of an illustrative three input, single output read-only associative memory of a first known class (ROAM 1).
FIG. 3 is a schematic diagram of an illustrative 5 input, single output read-only associative memory of a second known class (ROAM 2).
Figure 4:
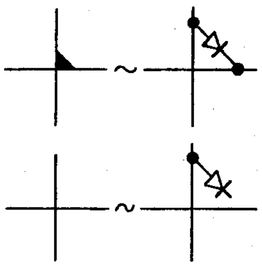
FIG. 4 illustrates the meaning of the array cross-connection symbols employed in FIGS. 5, 6 and 12 of the drawings.

FIG. 1 shows a 16-word by 1-bit read-only memory (ROM). This device is operated by placing a four-bit address onto the four input lines $I_1$, $I_2$, $I_3$, and $I_4$. This address then reads out the bit stored at the corresponding address in the ROM. If the diode at the address is connected to both lines a 1 ($V_E$) is read out, otherwise a 0 (ground) is read out.

To see how the device actually works, assume that $V_E$ is above ground (G) and $R_2$ is much greater than $R_1$. When a four-bit address is placed on $I_1$, $I_2$, $I_3$ and $I_4$ exactly one of the lines A, B, C, and D becomes $V_E$ and the rest are G. Simultaneously, exactly one of lines 1, 2, 3 and 4 becomes $V_E$ and the other lines are G. Assume lines C and 2 are selected and become $V_E$. The transistor $T_c$ then forms a path for current to flow through $R_1$ to ground. This current is supplied by one of two sources. If a diode exists at the intersection of lines C and 2 [as it does in FIG. 1] then the current is supplied through the diode at the intersection of lines C and 2; i.e., point $0_C$ is at $V_E$ which forces the output to be near $V_E$.

In order to see what happens when the diode is not connected, assume a new address is placed on the input lines and lines 2 and B go to $V_E$. The diode at the intersection of lines 2 and B is not connected; therefore, point $0_B$ tends to go to G and current is supplied by the power supply through $R_2$ and $D_B$ to $T_B$ which is a path to ground. Since $R_2$ was made much larger than $R_1$, the output is forced to G. The diodes $D_A$, $D_B$, $D_C$, and $D_D$ prevent unwanted currents from flowing. In the case under consideration, lines 2 and B are at $V_E$, but since line 2 is at $V_E$, the diode at the intersection of lines 2 and C wants to form a current path. Since $T_c$ is not turned on (line C is at G), current would tend to flow to point $0_c$, then to point $0_B$ (raising the output to $V_E$) finally to ground through $T_B$ if diode $D_c$ were removed. Therefore, diode $D_c$ is necessary to stop this unwanted flow of current and keep the output at ground (G) which is what was desired.

FIG. 2 shows a three-input, one-output, read-only associative memory (ROAM). This device is operated by placing a three-bit address onto the three input lines A, B, and C. If this address matches an address that has been previously stored in the ROAM, then a 1 appears on the output line of the ROAM. If the address doesn't match any of the addresses stored in the ROAM a 0 appears at the output of the ROAM. This network can be used to generate logic functions by associating a minterm with a minterm that has been previously stored in the ROAM. To see how the circuit actually works, assume that $-V_E$ is below ground (G) and that $R_2$ is much greater than $R_1$. If negative logic is assumed ($-V_E = 1$ and $G = 0$) then the circuit in FIG. 2 can be used to perform the logic function $f = A\bar{B}\bar{C} + \bar{A}C + ABC + \bar{A}\bar{B}\bar{C}$. Assume that $A = 1$, $B = 1$, and $C = 1$ is put onto the input leads then in row 3 of the ROAM in FIG. 2, $-V_E$ appears at the vertical connection point of all diodes in row 3. This leaves point $0_3$ near $-V_E$ and current flows through $R_2$, $R_3$, and $R_1$ to the terminal at $-V_E$. Since $R_2$ is much greater than $R_1$, the output is about $-V_E$ and a logical 1 appears at the output. All other rows are mismatched and each of the lines $0_1$, $0_2$, and $0_4$ were held to ground because (considering row 1) in each row at least one diode's anode was tied to ground, causing the horizontal line to be at ground, therefore, not biasing the diodes $D_1$, $D_2$, and $D_4$ on. If the address was a mismatch in all rows, $0_1$, $0_2$, $0_3$, and $0_4$ would all be near G and the output would be G.

In summary, a mismatch on any bit causes the row to leave the output at ground. Any row that has all matches ($-V_E$ on the anode of all connected diodes in that row) will allow the output diode of the row to conduct pulling the output negative (logical 1). One advantage of ROAM is that "don't care" conditions can be programmed in by not connecting diodes. If positive logic were used and $G = V_E$ and $-V_E = 0$ then logic functions compatible with ROM could be realized because the ROAM would then produce OR-AND logic. In positive logic, the ROAM shown in FIG. 2 produces the function $$f = (A+\bar{B}+\bar{C})\,(\bar{A}+C)\,(A+B+C)\,(\bar{A}+\bar{B}+\bar{C})$$

The read-only device of FIG. 2 (ROAM 1) employes input inverters to provide double-rail logic for all variables. Where double-rail logic is required by less than all variables, the second class of read-only associative memory (ROAM 2) shown in FIG. 3 may be used. This arrangement, also called the SLT (Solid Logic Technology) array, and its use in generating logic functions, is further discussed in a paper entitled "Structured Logic", by R. A. Henle et al., pp. 61 –68, AFIPS Conference Proceedings, Fall Joint Computer Conference (November 1969).

Figure 5:
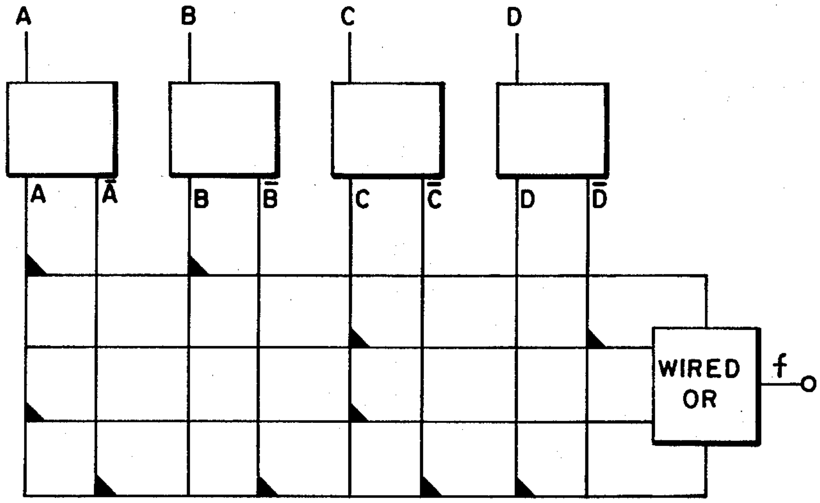
FIG. 5 illustrates the manner in which a read-only associative memory of the first class (ROAM 1) may be used to realize arbitrary logic statements; in this case: $AB + C\overline{D} + AC + \overline{ABC}D$.
Figure 6:
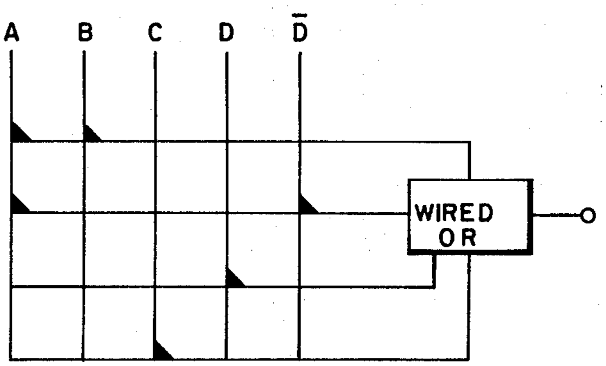
FIG. 6 illustrates the manner in which a read-only associative memory of the second class (ROAM 2) may be used to realize arbitrary logic statements; in this case, $AB + A\overline{D} + C + D$.

FIGS. 2 and 3 illustrate two versions of the read-only associative memory using diodes; however, they could have been just as easily implemented using transistors. In FIG. 2, if $-V_E = 1$ and $G = 0$ then it can be seen that the output line E is 1 if and only if the input word A, B, and C exactly matches a word stored in the ROAM. This then allows the construction of logical product terms, one in each row of the ROAM. These product terms can then be wire ORed together to form a Boolean function in the sum of products form. FIG. 5 illustrates the implementation of the function $F = AB + C\bar{D} + AC + \bar{A}\bar{B}\bar{C}D$ in ROAM 1. A function such as $f = A\bar{D} + C + D$ cannot be implemented in ROAM 2 unless both of the variable D and $\bar{D}$ are available on a separate line as shown in FIG. 6. Therefore, ROAM2 is not quite as flexible as ROAM 1, but it can be used for functions that do not require double rail logic for all variables.

DESCRIPTION OF THE PREFERRED EMBODIMENTS OF THE INVENTION

In its preferred form, the present invention makes use of the read-only associative memory arrays to provide multi-function, programmable combinational logic modules which may be employed, in place of a variety of single-function devices, as the basic building block of a large-scale information processing system.

Figure 8:
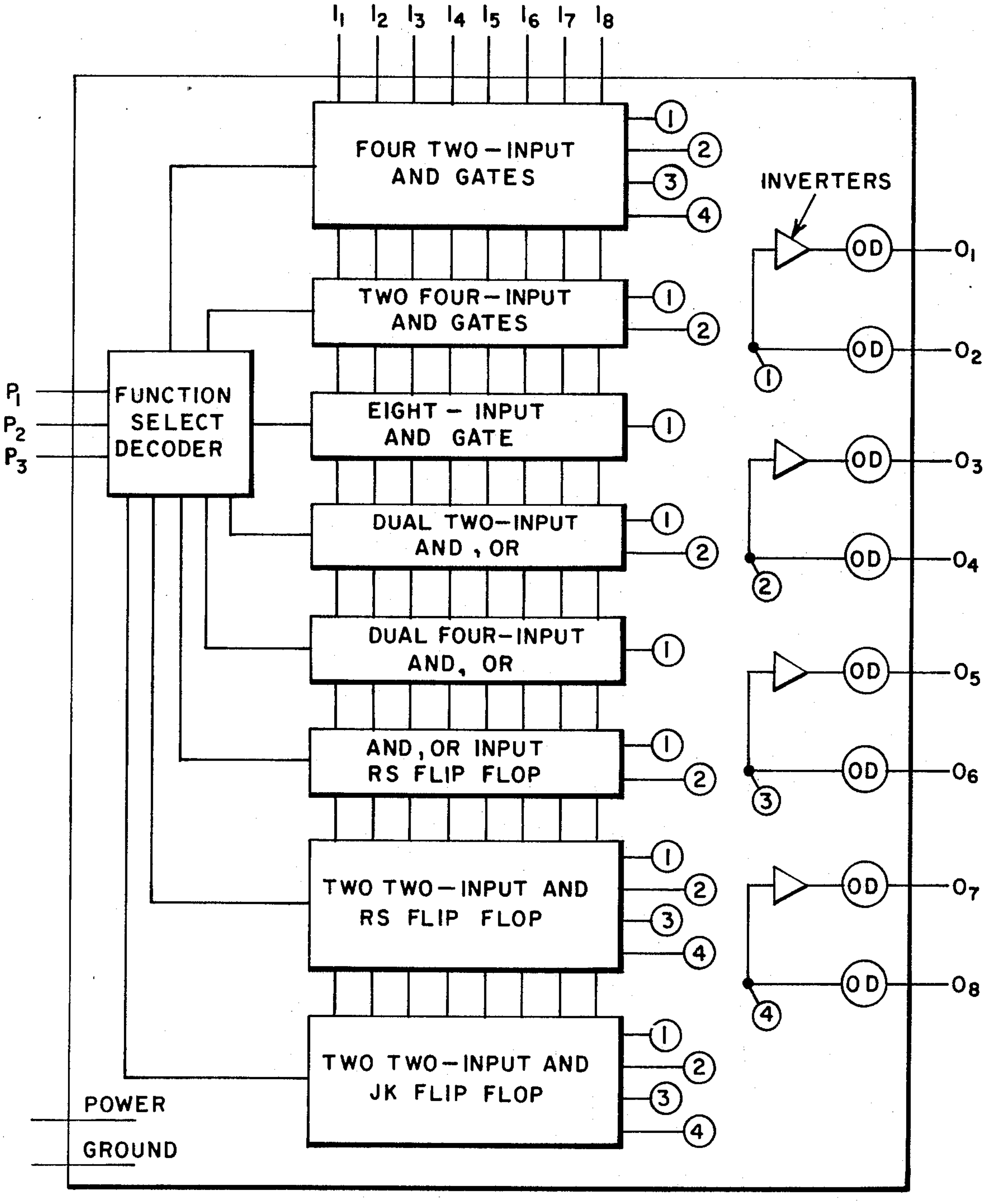
FIG. 8 is a block diagram of a module constructed according to the present invention for supplying the eight functions listed on the table of FIG. 7.

The preferred combinational module provides a known group of 8 basic logical functions identified in the table of FIG. 7 and is generally organized as shown in the block diagram of FIG. 8.

Each of the eight functions listed in the table of FIG. 7 is provided by a read-only associative memory array, the arrays having eight common input conductors $I_1$ through $I_8$. That one of the eight arrays which is to be operative is selected by the 3-bit function select control signal ($P_1$, $P_2$, $P_3$) applied to the function select decoder, which is itself implemented by means of a read-only associative memory array.

The module delivers 4 "true" outputs ($O_2$, $O_4$, $O_6$, $O_8$) and 4 "complementary" outputs ($0_1$, $0_3$, $0_5$, $0_7$) each of the eight output conductors having its own output driver OD. The connections between the inputs to the inverters and output drivers and the outputs of each functional array are indicated by the numbered circles (e.g., the input "1" to the output driver for output $0_2$ is connected to the uppermost output conductor 1 from each of the eight arrays).

Because each module is interconnected with like modules to produce the desired, large-scale logic system, and because both true and complementary outputs are available from each module, by selection of appropriate outputs and judicious use of complementary inputs, the module can produce 25 different major functions as shown in FIG. 9. The single module is therefore capable of replacing a large percentage of the random logic packages which would otherwise be employed. With enough modules any arbitrary logic functions can be generated. Moreover, the consequent volume use of this single, versatile module reduces its unit cost to a level competitive with the use of numerous, less complex packages.

The use of the read-only associative memory array to implement the combinational module possesses significant advantages. First, the consistent use of such arrays yields a highly regular structure with a minimum random wiring, a factor of great importance in design and manufacture of LSI circuit packages. Although the read-only memory (ROM) of FIG. 1 may be employed to realize the module, the use of read-only associative memory (ROAM 1 or ROAM 2) arrays eliminates the need for the large number of small decoders needed with ROM arrays, and produces a faster device due to the reduction in multiple-level "gate" delays. The comparative economics between using ROM, ROAM 1 and ROAM 2 arrays to realize the module are discussed in more detail in applicants' paper entitled "Universal Logic Modules Implemented Using LSI Memory Techniques", pp. 177–194, AFIPS Conference Proceedings, Fall Joint Computer Conference (1971).

Figure 10:
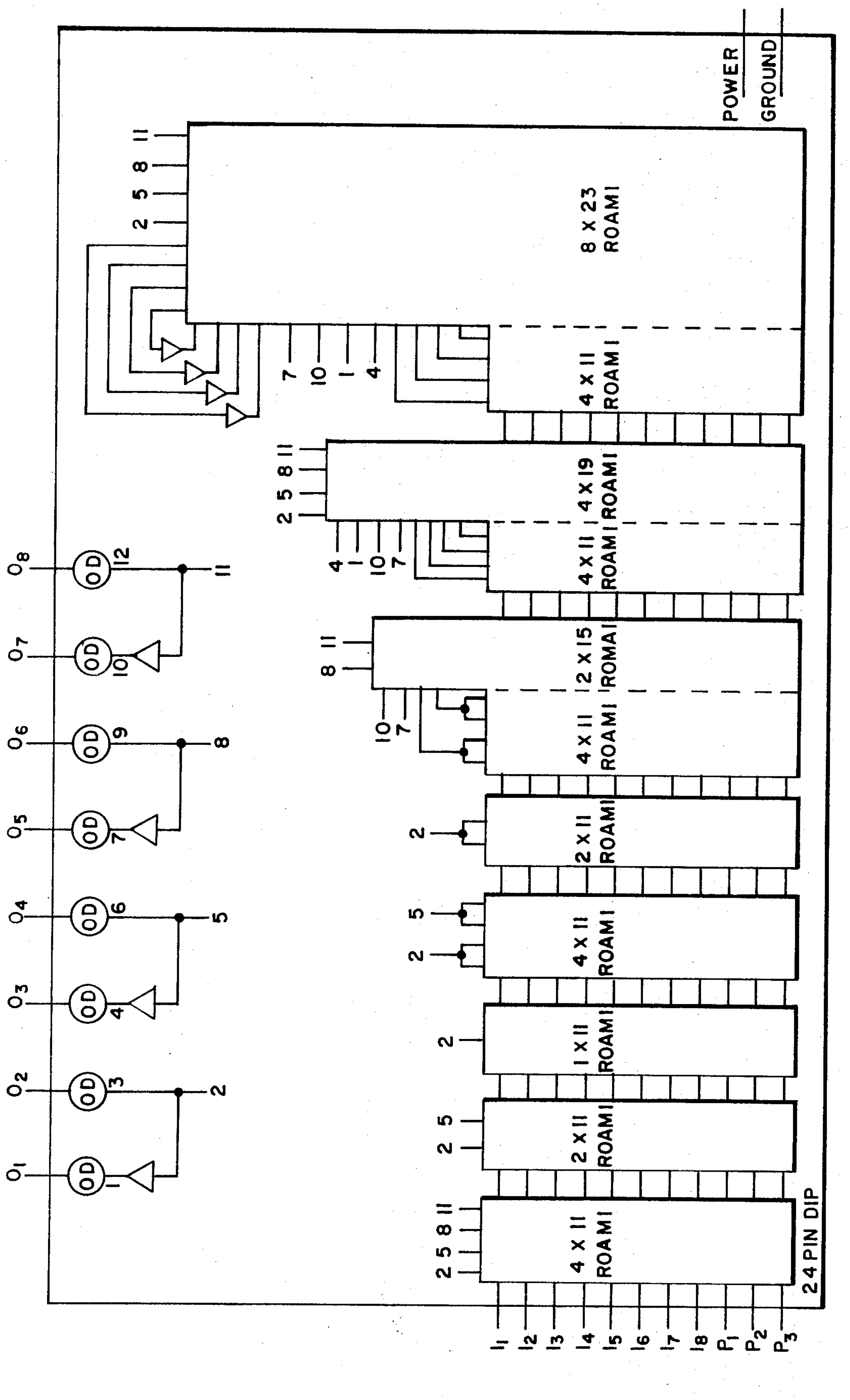
FIG. 10 is a block diagram showing the manner in which the module of FIG. 8 is instrumented using ROAM 2 arrays.

FIG. 10 of the drawings shows the manner in which the module, shown in block form in FIG. 8, is instrumented using ROAM-2 arrays. In FIG. 10, the eight ROAM 2 arrays provide, from left to right, the functions listed in the table of FIG. 7.

Figure 11:
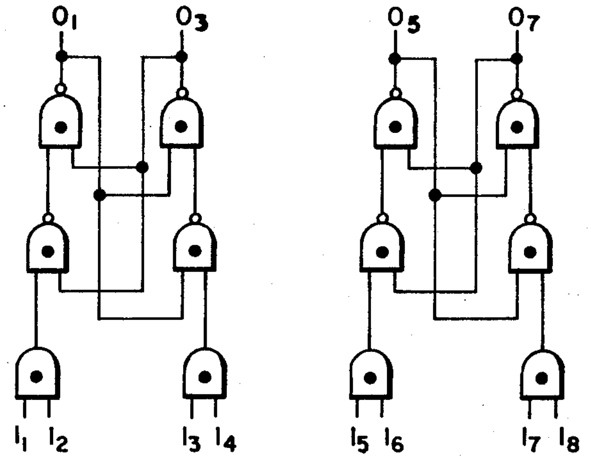
FIGS. 11 and 12 respectively show the conventional logic symbol diagram for 2 JK flip-flop and the details of a ROAM 2 array for providing the equivalent function.
Figure 12:
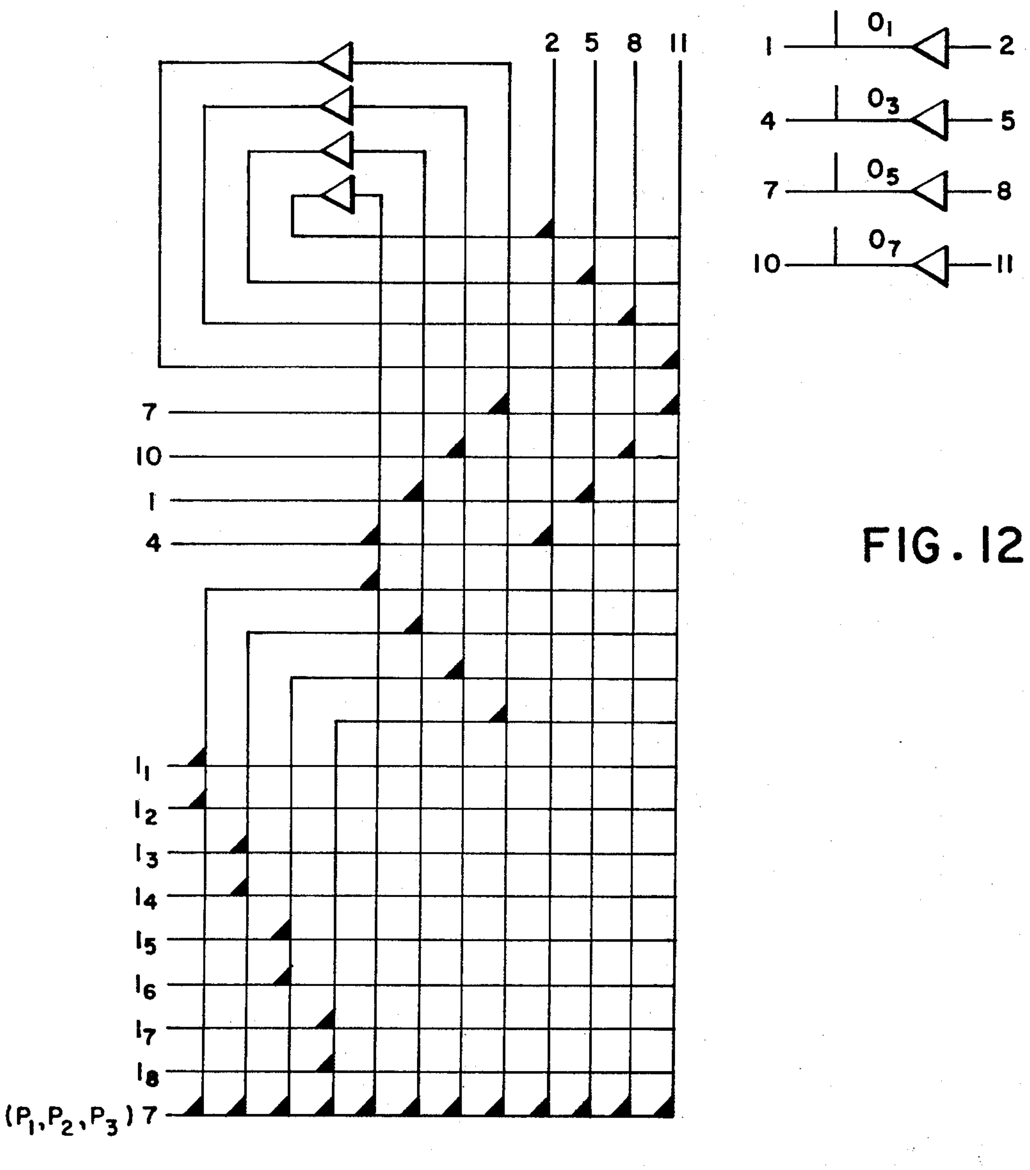

The details of the most complex of these arrays (the two JK flip-flops) is shown, by way of example, in FIGS. 11 and 12 of the drawings, FIG. 11 showing the conventional logic symbols diagram for the two JK flip-flops, and FIG. 12 showing the ROAM 2 array crossconnections used to realize this function. It will be apparent, the remaining functions of FIG. 7, or any other arbitrary selected functions which might be desired, may be instrumented using a ROAM 2 array in a similar manner. The 3 × 8 ROAM 1 array shown at the lower left in FIG. 10 energizes the lowermost, horizontal "row conductor" in one of the eight arrays, depending upon the value of the 3-bit control signal applied at pins $P_1$, $P_2$, $P_3$.

Thus the module may operate upon the applied information signals in any one of eight possible ways, depending on the control signal applied to the function-selecting array. The module may operate in a "dedicated" fashion, with fixed function-selecting control signals being continuously applied. Alternatively, in a sequential machine, the function-selecting control signals may change in time, allowing the module to operate as first type of logical device at one time, but as other types of devices at later times.

Moreover, the principles of the present invention may be employed to produce a selectable-function sequential logic module, which may be interconnected with the combinational module previously described, to form more complex sequential information processing systems and subsystems.

Figure 14:
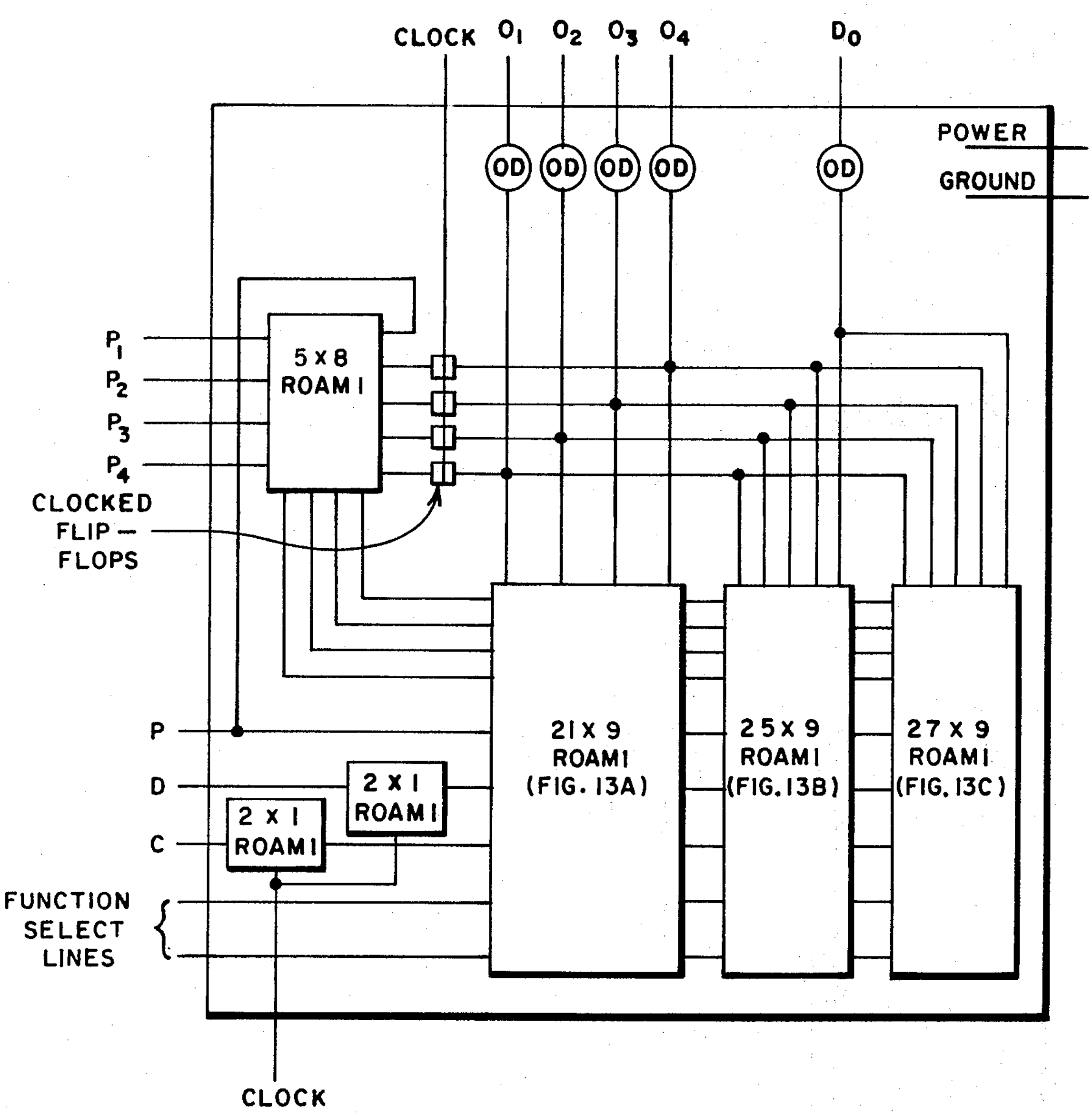
FIG. 14 is a block diagram of a sequential logic module employing the principles of the present invention and realized through the use of ROAM 1 arrays.

The sequential module is described functionally by FIGS. 13A, 13B and 13C of the drawings, and schematically in FIG. 14 of the drawings.

FIGS. 13A, 13B and 13C are flow table descriptions of the three functions that can be performed by the module, these being three different counters. The four-bit binary counter, described by FIG. 13A, has the capability to count up or down with a range of 16 different numbers; i.e., 0 to 15. This counter can also be reset to 0. The second counter, described by FIG. 13B, is an up-down BCD (binary-coded decimal) decade counter. This counter can count up or down and can also be preset to a value. This counter is constrained to count between 0 and 9 and can be ganged with other decade counters to form a counter capable of counting between 0 and 999 . . . 9. The last counter, described by FIG. 13C, is an updown, four-bit binary counter. This counter can be preset to a value and is constrained to count between 0 and 15. This counter can also be ganged with other binary counters. The differences between the first counter and this counter are that this counter can be preset to any value and ganged with other binary counters.

As shown in FIG. 14, the three counting functions defined respectively by the flow tables of FIGS. 13A, 13B and 13C are realized with ROAM 1 (double-rail) arrays. The output "count" from the array selected, by appropriate energization of the function select lines, are presented through the output drivers at $0_1$, $0_2$, $0_3$ and $0_4$. The "carry output" appears at $D_o$. The 4 count values are also applied, through clocked flip-flops to the 5 × 8 ROAM 1 array (forming 8 AND gates driving 4 wired OR's) which functions to selectively deliver the last output ($0_1$, $0_2$, $0_3$, $0_4$) or the preset input ($P_1$, $P_2$, $P_3$, $P_4$) to the 3 counter arrays via the four uppermost, horizontal, double-rail input conductors, ($I_0$, $I_1$, $I_2$, $I_3$) depending upon whether or not the preset control conductor P is energized. The D and C inputs, each connected through 2 × 1 ROAM 1 clocked AND gates to horizontal inputs to the counter arrays.

While specific examples of combinational and sequential modules have been described, it will be apparent to those skilled in the art that numerous modifications may be made to the specific arrangements described without departing from the true spirit and scope of the invention.

What is claimed is:

1. A modular circuit for performing a selected one of plural combinational logic functions, said circuit comprising, in combination, N data input terminals for receiving a parallel-binary data signal containing up to N bits of information from a first external source;

control input terminals for receiving control signals from a second external source;

data output terminals for delivering result signals to an external utilization circuit;

a plurality of read-only associative memory arrays, each having at least N input row data conductors, at least one function-selecting input row conductor, and plural output column conductors with specified semiconductor cross-connections between said column and row conductors, said N input row conductors being common to all of said arrays;

means connecting said N common input row conductors to receive said parallel-binary data signal from said N data input terminals;

means for supplying programming signals to each of said function-selecting input row conductors to activate a selected one of said arrays in response to the control signals to said control input terminals; and means connecting each of said data output terminals to at least one column conductor in each of plural ones of said arrays.

2. A logic module as set forth in claim 1 including a second set of data output terminals for delivering complementary result output signals to an external utilization circuit, each of said second set of output terminals being connected to the output of an inverter whose input is connected to a single output column conductor in each of plural ones of said arrays.

3. A logic module as set forth in claim 2 in which M equals one and said means for supplying program signals to said M function-selecting input row conductors comprises a further read-only associative memory array having its input row conductors connected to said control input terminals and each of its output column conductors connected to the function-selecting input row conductor in a different one of said arrays.

* * * * *